United States Patent [19]

Pierson

[11] 4,377,480

[45] Mar. 22, 1983

[54] VACUUM BELT FILTER

[76] Inventor: Henri G. W. Pierson, Wellingborough, England

[21] Appl. No.: 327,208

[22] Filed: Dec. 3, 1981

[30] Foreign Application Priority Data

Feb. 18, 1981 [GB] United Kingdom ................. 8105143

[51] Int. Cl.³ ............................................. B01D 33/04
[52] U.S. Cl. .................................... 210/350; 210/386;
210/400; 210/406; 100/118; 100/211
[58] Field of Search ............... 210/783, 791, 138, 141,
210/142, 143, 153, 160, 297, 324, 350, 386, 400,
401, 406, 407; 100/118, 211

[56] References Cited

U.S. PATENT DOCUMENTS 3,307,704  3/1967  Pashaian ............................. 210/400
4,008,158  2/1977  Davis ................................. 210/400
4,153,550  5/1959  Lautrette ............................ 210/401
4,203,836  5/1980  Hallack ............................. 210/406

Primary Examiner—Ernest G. Therkorn
Attorney, Agent, or Firm—Ross, Ross & Flavin

[57] ABSTRACT

Belt 21 on which a residual filter cake has been formed by the action of a suction box (16, FIG. 1) on a slurry, is brought over a filter grid 46 superimposed on a membrane 42 inflation of which causes the filter cake to be compressed upwards against stationary pressure plate 53 for further dewatering. The grid 46 has parallel grooves in its top surface and further parallel grooves in its under-surface, and intersecting with and communicating with those in the top surface, to permit suction to be applied by way of suction pipe 146 and drain duct 45. The belt 21 is intermittently driven, but the arrangement may be such that the belt moves continuously and the grid 46, membrane 42 and pressure plate 53 move in sequence, forwards from a starting position for a certain distance in contact with the belt while applying pressure to the filter cake and then backwards to the starting position out of contact with the belt.

7 Claims, 3 Drawing Figures

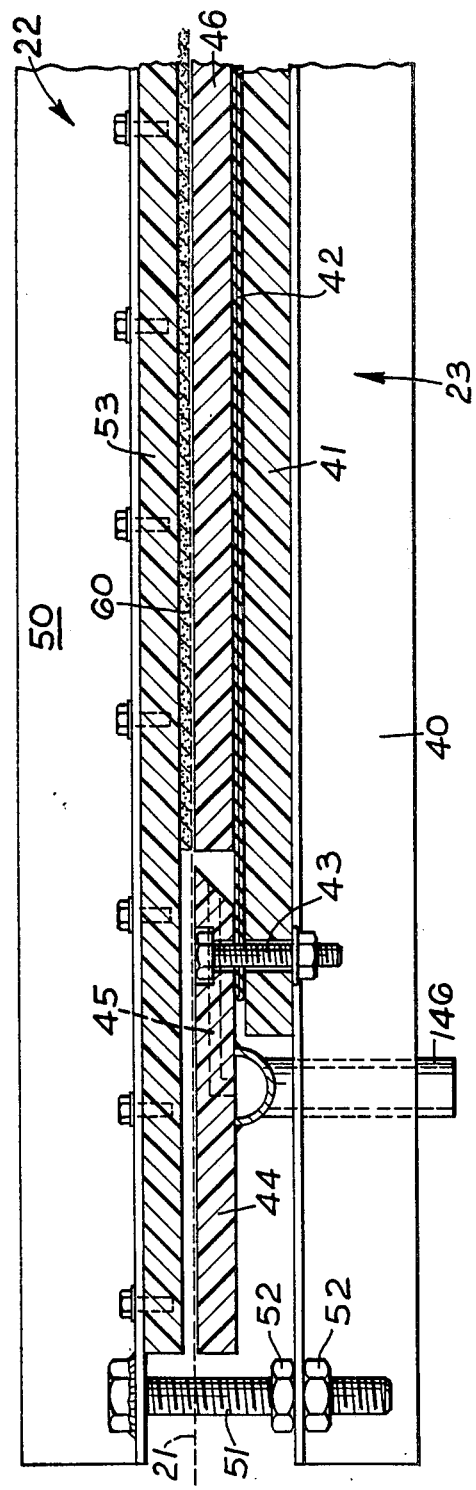
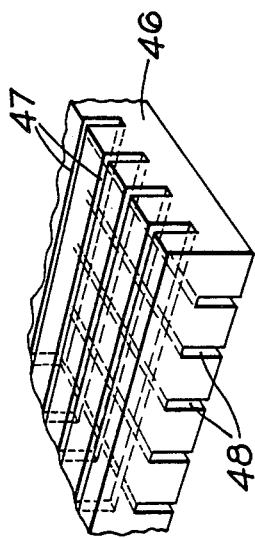
Fig. 2
Fig. 3

VACUUM BELT FILTER

This invention concerns vacuum belt filters.

In certain known types of horizontal vacuum belt filters, which may include either intermittently moving filter belts or continuously moving filter belts, proposals have already been made to introduce a compression zone in which the filter cake, already formed on the belt by the application of vacuum thereto, is subject to mechanical pressure to dewater it further.

The known arrangements normally employ an inflatable membrane which is mounted so as to be above the filter cake and is connected to hydraulic or pneumatic pressure source. In the case of intermittently-moving vacuum belt filters, the membrane is inflated, at intervals, whilst the belt is stationary, so that it bears down on the filter cake therebeneath to squeeze residual liquor from the cake. In the case of continuously-moving vacuum belt filters, the membrane may move in sequence, firstly forwards in contact with the belt while applying pressure to the filter cake and, at intervals, be raised from the belt to move backwards to its original position to subsequently move forwards again.

A practical disadvantage of the known proposals resides in the fact that it is difficult to avoid adhesion between the cake and the membrane. The membrane is usually a rubber-based material of a pliable nature which tends to provide a perfect surface for the filter cake to stick to.

Another disadvantage is that it is extremely difficult to ensure that the membrane does not develop any folds, particularly after a period of use when the membrane has stretched. Any such folds hamper separation of the cake from the membrane.

An object of the present invention is to provide a construction of vacuum belt filter by which these disadvantages are eliminated, the mechanical compression being achieved without the filter cake coming into contact with an inflatable membrane.

With this object in view, the present invention provides a vacuum belt filter including an endless belt guided to include a vacuum section which passes over vacuum boxes for dewatering a slurry to leave thereon a residual filter cake layer, and a compression section extending through a mechanical compression assembly by which the filter cake is subjected to mechanical compression for subsequent dewatering, characterised in that the mechanical compression assembly includes a pressure plate disposed above the compression section of the belt and presenting a non-stick surface thereto, and a filter grid which is disposed below the belt, capable of movement both towards and away from the belt and superimposed upon an inflatable membrane inflation of which serves to press the filter grid and belt upwards towards the pressure plate to compress any filter cake present on the belt.

With such an arrangement, the facing surfaces of the pressure plate and the filter grid can be made perfectly flat so that the pressure applied to the filter cake will be substantially even over all areas of the filter cake. Moreover, the non-stick surface eliminates cake build-up, and substantially improved operation is possible. A further advantage lies in the fact that the structure provided above the belt at the compression section does not have to be so heavy and robust as in the prior known proposals since it has to support only a vertically non-displaceable pressure plate and does not have to incorporate the cumbersome and complicated pressure chamber arrangement necessary in the known arrangements for pressing the membrane down onto the cake and filter belt.

The invention will be described further, by way of example, with reference to the accompanying drawings, in which:

FIG. 2 is an enlarged framentary section illustrating the construction of the compression assembly of the belt filter of FIG. 1; and FIG. 3 is a fragmentary perspective view illustrating the form of the filter grid of the compression assembly shown in FIG. 2.

Figure 1:
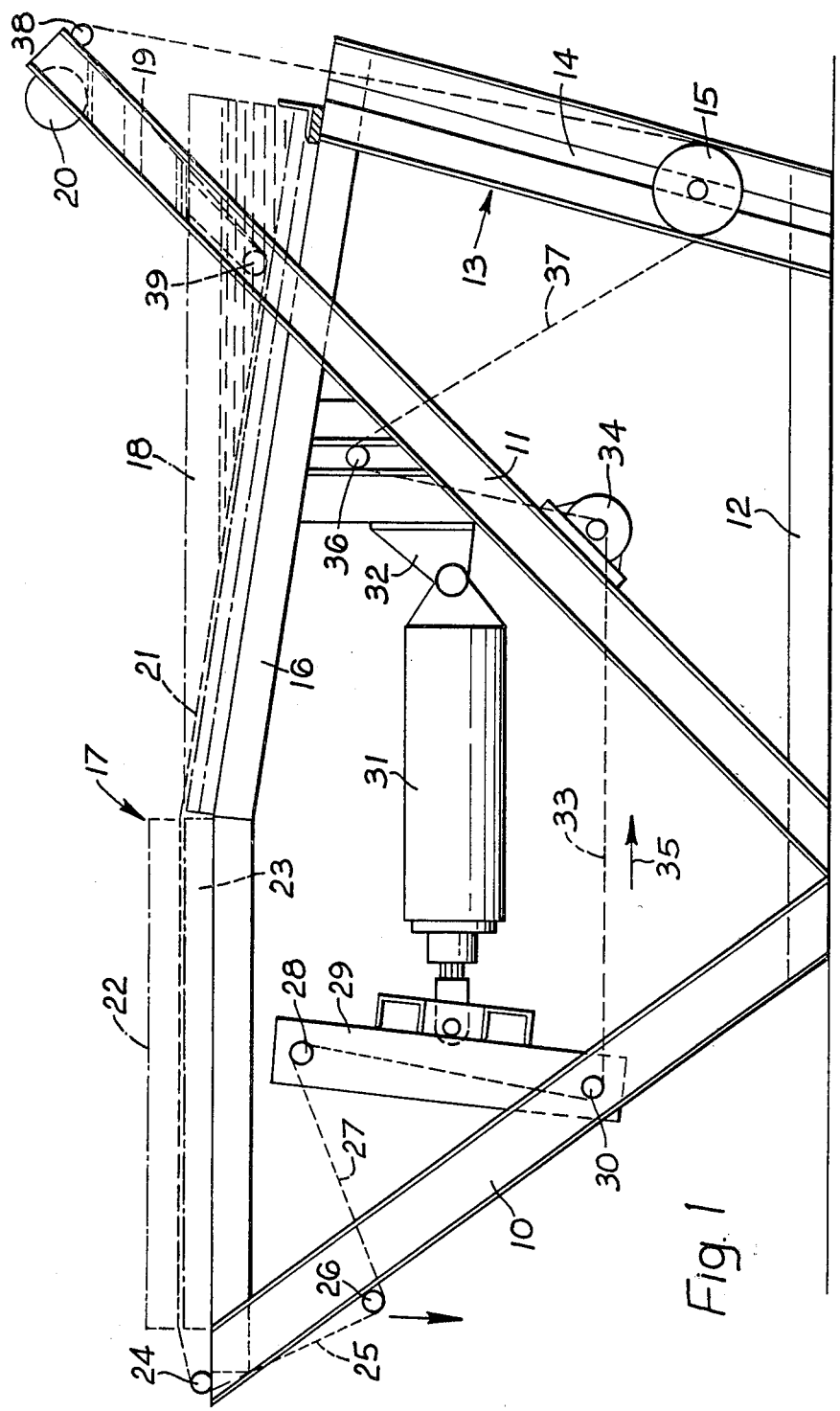
FIG. 1 is a diagrammatic side elevation illustrating a practical embodiment of the belt filter of the invention.

Referring firstly to FIG. 1 of the drawings, a vacuum belt filter of the kind in which the filter belt moves intermittently and constructed in accordance with the invention comprises a supporting framework including, at each side, front and intermediate girders 10, 11 extending upwards from one end of a ground bearer 12 to the other end of which is connected a rear girder assembly 13 having a central slot 14 providing guides for the ends of a heavy tensioner roller 15. The framework serves to support a vacuum box 16 and a mechanical compression assembly which is indicated generally by the reference numeral 17 and details of which are illustrated in FIGS. 2 and 3. The front end of the compression assembly 17 connects with the upper end of the front girders 10 and the rear end thereof connects with the front end of the vacuum box 16 the rear end of which extends beyond the intermediate girders 11 and connects with the upper end of the rear girder assembly 13.

The vacuum box 16 is superimposed by a slurry retainer structure 18 provided beneath a feed plate 19 supported along the upper parts of the intermediate girders 11 below a slurry feed pipe 20 by which slurry to be dewatered is fed to the apparatus, to accumulate within the structure 18, and a vacuum section of an endless filter belt 21 is disposed thereabove.

The compression assembly 17 includes an upper stationary pressure plate arrangement indicated generally by the reference numeral 22 and a lower expansible arrangement indicated generally by the reference numeral 23, the details of which will be described later with reference to FIGS. 2 and 3. The belt 21, emerging from the vacuum section above the vacuum box 16, extends as a compression section, between the upper and lower arrangements 22, 23 of the compression assembly 17. At the upper end of the front girder 10, a front guide roller 24 guides the belt 21 in a downward position 25 which is followed by a take-off roller 26 whereat any filter cake (not shown) formed on the belt 21 is caused to separate from the latter and fall into a suitable receptacle (not shown). Following the take-off roller 26, the belt 21 extends in a bight 27 around a progressing roller 28, carried by swingable arms 29, to guide roller 30 which serves also as a pivot roller for the swingable arms 27. A pneumatic or hydraulic ram 31 is connected by one end to a bracket 32 and the intermediate girder 11 and by the other end to the arms 29.

From the pivot roller 30, the belt 21 extends as a substantially horizontal section 33 to a unidirectional device 34, which is a free-wheel or pawl and ratchet arrangement, whereby the direction of movement of the belt 21 is restricted to that indicated by the arrow 35, whereafter it passes over an idler roller 36 and then in a tensioner bight 37 around the tensioner roller 15. From this bight 37, the belt 21 extends to a feed roller 38 at the upper end of the intermediate girders 11 after which it extends in a feed section, above the feed plate 19 and below the feed pipe 20, to a submerged roller 39 located within the slurry retainer structure 18.

FIGS. 2 and 3 illustrate details of the compression assembly 17. As can be seen, the lower expansible arrangement 23 comprises angle-sectioned supports 40 which support a thick polypropylene lower pressure plate 41 transversely across the machine, in register with and below the compression section of the belt 21. Superimposed upon the lower pressure plate 41 is an inflatable membrane 42 made, for example from rubber, this being effectively in the form of a flat bag and clamped in place by bolts 43 which serve to grip the edges of the membrane 42 between edge strips 44 of which at least one (as shown) incorporates a drain duct 45 leading to a suction pipe 46, the duct 45 having an entry end facing towards the upperside of the membrane 42.

The membrane 42 is overlaid by a polypropylene suction grid 46 which, as can be seen from FIG. 3, is formed in its upper surface with parallel grooves 47 extending in one direction and in its under-surface with parallel grooves 48 extending at right angles to the grooves 47 and meeting with the latter, so that these grooves communicate with one another. The suction grid 46 is substantially rectangular and of dimensions corresponding to the compression section of the belt 21; it is confined within the edge strips 44, with a small clearance relative to the latter.

The upper stationary pressure plate arrangement 22 comprises respective angle-sectioned supports 50 to which are fixed mounting bolts 51 projecting downwards and located in the supports 40 by pairs of nuts 52 whereby the height and parallelism of the upper arrangement 22 may be adjusted relative to the lower arrangement 23. These supports 50 serve to locate in place, above the suction grid 46 and its edge strips 44, a thick stationary upper polypropylene pressure plate 53, it being understood, of course, that the belt 21 extends between the upper plate 53 and the grid 46.

The manner of operation of the apparatus as described is as follows. Assuming, initially, a slurry to be supplied by way of the pipe 20, this flows down the feed section of the belt 21 and accumulates within the retainer structure 18, an appropriate layer arising on the belt 21. On the vacuum section of the belt 21, overlying the vacuum box 16, the slurry layer is dewatered and accumulates as a thin layer of filter cake, the extent or thickness of the layer depending upon the angle of inclination of the vacuum section of the belt 21 which depends upon the upward inclination angle of the vacuum box 16 which in the illustrated case is of the order of 8° but may be, for example, chosen in the range of 4° to 20°.

Simultaneously, in the compression assembly 17, filter cake already formed on the belt 21 and previously dewatered by vacuum in the vacuum section, is subjected to mechanical pressure. This is achieved by supplying fluid (e.g. air or a hydraulic liquid) under pressure into the inflatable membrane 42. Expansion of the membrane presses the filter grid 46 thereabove directly upwards against the underside of the filter belt 21 in the compression section thereof thereby squeezing the filter cake, which is indicated at 60 in FIG. 2, and expressing therefrom at least some of any liquid remaining therein after the dewatering by suction in the vacuum section.

Suction applied to the suction pipe 46 conducts away this liquid.

After a predetermined period of time, the vacuum to the vacuum box 16 and the pressure fluid to the inflatable membrane 42 are switched off so as to relax their action on the belt 21 and the filter cake. Thereupon, the ram 31 is actuated to swing the arms 29 in a clockwise direction (considered as in the drawing) thereby to increase the extent of the bight 27 which the effect of causing a forward step or progression of the upper ram of the belt 19, with part of that ram being drawn into the bight 27. The tensioner roller 15 rises to permit this operation whilst maintaining the belt 19 under its desired tension.

The belt 19 having been progressed forward by one step, the vacuum and the pressure fluid are switched on again and the slurry and filter cake are subjected to dewatering again as above described. The subjection of the belt 19 to suction and compression serves, of course, to maintain the belt 19 substantially stationary. Accordingly, during the dewatering, the ram 31 is actuated again to swing the arms back in the anticlockwise direction, and the belt length thereby released from the bight 27 is taken up in the tensioner bight 37 by the roller 15 moving downwards. The presence of the indirectional arrangement 34 serves, therefore, to eliminate the need for a motor the like to drive the belt 19 which is simply progressed stepwise by the action of the ram 31.

As the belt 19 is progressed, substantially dry filter cake is carried by the belt 19 down to the discharge roller 26 whereat the sharp angle of deflection of the belt coupled with the fact that the belt subsequently progresses upwards, ensures that the filter cake is separated from the belt and falls into a suitable receptacle.

It will readily be understood that with the arrangement of the invention, there is substantially no risk of adhesion of the filter cake to components of the apparatus at the compression section, since the compression is effected on the one side by a surface of a polypropylene pressure plate 53 against which the filter cake itself engages, and on the other side by the polypropylene grid 46 against which the belt 19 engages. Accordingly the arrangement of the invention operates more reliably and freely than the prior known proposals.

The invention is not confined to the precise details of the foregoing example and variations may be made thereto. Thus, for instance, the compression section may incorporate components different from those described. The pressure plates 41 and 53 and the pressure grid 46 may be made from materials other than polypropylene; they may, for instance, be of metal coated with a non-stick material such as polytetrafluoroethylene. The apparatus may, if desired, be constructed for the angle of the vacuum section to be varied, e.g. by varying the disposition of the vacuum box 16. Other arrangements for progressing the belt may be employed.

Although the embodiment of the invention described includes an intermittently-moving filter belt, it should be appreciated that the invention is not limited thereto. A further embodiment of the invention includes a continuously-moving filter belt and a compression assembly which moves forwards in register with the belt while applying pressure thereto but moves backwards to its original position whilst said pressure is released.

I claim:

1. A vacuum belt filter comprising: a unidirectional endless belt, drive means for intermittently driving the belt in the one direction, guide means for guiding the belt along a substantially horizontal upper run defining a rearward vacuum section and a forward compression section, supply means for charging a slurry to the upper belt surface at the vacuum section, a vacuum box disposed below the belt at the vacuum section, means for applying a vacuum to the vacuum box for dewatering the slurry and leaving a layer of a residual filter cake on the belt, a mechanical compression subassembly at the compression section through which the belt extends and including a stationary upper pressure plate disposed above the belt and having a nonstick surface facing downwardly toward the belt and a filter grid disposed below the belt and having an upper surface presented upwardly toward the belt and a downwardly-presented under surface and an inflatable membrane disposed below the filter grid adjacent the under surface and an inflation means for inflating the membrane into an upwardly pressing relationship with the filter grid and belt toward the upper pressure plate for compressing the filter cake.

2. The vacuum belt filter as set forth in claim 1 and further including: a lower pressure plate disposed below the membrane, and edge strips bolted to the lower pressure plate for confining the filter grid and clamping the membrane relative to the lower pressure plate.

3. The vacuum belt filter as set forth in claim 2 and further including: a drain duct incorporated into one of the edge strips.

4. The vacuum belt filter as set forth in claim 1 and further including: a plurality of first grooves extending in one direction in the upper surface of the filter grid and a plurality of second grooves in the under surface of the filter grid intersecting with and communicating with the first grooves.

5. The vacuum belt filter as set forth in claim 4 wherein: the first grooves extend in parallelism and the second grooves extend in parallelism and at right angles to the first grooves.

6. The vacuum belt filter as set forth in claim 4 and further including: a framework including a pair of front girders extending upwardly and forwardly at the front end of the filter, a rear girder assembly disposed at a rear end of the filter and spaced at a distance from the front girders and extending upwardly in an inclining direction away from the front girders, and support means supporting the compression subassembly and vacuum box relative to the framework, the compression subassembly having its front end connecting to the upper end of the front girders and its rear end connecting to the vacuum box, and the vacuum box having its rear end connecting to the upper end of the rear girder assembly and its front end connecting to the compression subassembly.

7. The vacuum belt filter as set forth in claim 1 and further including: a framework including a pair of front girders disposed at a front end of the filter and extending upwardly and forwardly from lower ends to upper ends thereof, and a rear girder subassembly disposed at the rear end of the filter and spaced from the front girders and extending upwardly from respective lower end to an upper end thereof in a direction inclining away from the front girders, and support means supporting the compression subassembly and vacuum box between the upper ends of the front girders and the rear girder subassembly, the compression assembly having its front end connecting to the upper ends of the front girders and its rear end connecting to the vacuum box, the vacuum box having its rear end connecting to the upper end of the rear girder subassembly and its front end connecting to the compression subassembly.

* * * * *